United States Patent
Murray et al.

(10) Patent No.: US 10,305,296 B2
(45) Date of Patent: May 28, 2019

(54) INTELLIGENT BATTERY SELF REPAIR

(71) Applicants: Sean K. Murray, Enfield, CT (US); David M. Rosenbush, Simsbury, CT (US)

(72) Inventors: Sean K. Murray, Enfield, CT (US); David M. Rosenbush, Simsbury, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 455 days.

(21) Appl. No.: 15/060,986

(22) Filed: Mar. 4, 2016

(65) Prior Publication Data
US 2017/0256963 A1  Sep. 7, 2017

(51) Int. Cl.
*H02J 7/00* (2006.01)
*B64G 6/00* (2006.01)
*H01M 10/48* (2006.01)
*H01M 10/42* (2006.01)

(52) U.S. Cl.
CPC ............. *H02J 7/0026* (2013.01); *B64G 6/00* (2013.01); *H02J 7/0016* (2013.01); *H02J 7/0021* (2013.01); *H02J 7/0063* (2013.01); *H01M 10/482* (2013.01); *H01M 2010/4271* (2013.01); *H02J 2007/0067* (2013.01)

(58) Field of Classification Search
None
See application file for complete search history.

(56) References Cited

U.S. PATENT DOCUMENTS

| 3,588,359 | A | * | 6/1971 | Cribb | H04M 9/001 |
| | | | | | 379/174 |
| 5,610,495 | A | | 3/1997 | Yee et al. | |
| 5,894,212 | A | | 4/1999 | Balogh | |
| 5,898,291 | A | | 4/1999 | Hall | |
| 5,923,148 | A | | 7/1999 | Sideris et al. | |
| 6,411,097 | B1 | | 6/2002 | Ashtiani et al. | |
| 7,126,310 | B1 | * | 10/2006 | Barron | H02J 7/0016 |
| | | | | | 320/108 |
| 7,535,199 | B2 | | 5/2009 | Kimura et al. | |
| 7,586,292 | B1 | | 9/2009 | Wakefield et al. | |

(Continued)

FOREIGN PATENT DOCUMENTS

KR  20070091814 A  9/2007

OTHER PUBLICATIONS

Extended European Search Report for European Patent Application No. 17158076.4, completed Jul. 10, 2017.

*Primary Examiner* — Thienvu V Tran
*Assistant Examiner* — David M Stables
(74) *Attorney, Agent, or Firm* — Carlson, Gaskey & Olds, P.C.

(57) ABSTRACT

According to one aspect of the present disclosure, a battery circuit is disclosed that includes a plurality of battery cells. The plurality of battery cells includes at least one connected battery cell and at least one disconnected battery cell. A first switch is configured to disconnect a particular one of the at least one connected battery cells, and a second switch is configured to connect a particular one of the at least one disconnected battery cells. A controller is configured to control the first and second switches based on a detected condition in the particular connected battery cell.

18 Claims, 4 Drawing Sheets

(56) References Cited

U.S. PATENT DOCUMENTS

| | | | |
|---|---|---|---|
| 8,143,851 B2 * | 3/2012 | Greening | G06F 1/189 |
| | | | 320/116 |
| 8,258,792 B2 | 9/2012 | Vandensande | |
| 8,427,106 B2 | 4/2013 | Kim et al. | |
| 8,471,529 B2 * | 6/2013 | Vance | B60L 11/1855 |
| | | | 320/118 |
| 9,069,027 B2 | 6/2015 | Chao et al. | |
| 9,213,066 B2 | 12/2015 | Wade | |
| 9,217,781 B2 | 12/2015 | Tabatowski-Bush et al. | |
| 9,276,422 B2 * | 3/2016 | Hotta | H01M 10/425 |
| 9,341,678 B2 * | 5/2016 | Kim | G01R 31/3606 |
| 2003/0190510 A1 | 10/2003 | Musselman et al. | |
| 2004/0055067 A1 | 3/2004 | Boettcher et al. | |
| 2012/0274140 A1 * | 11/2012 | Ganor | H02J 7/0011 |
| | | | 307/71 |
| 2013/0300426 A1 | 11/2013 | Butzmann | |
| 2013/0302657 A1 | 11/2013 | Itakura | |
| 2015/0364940 A1 | 12/2015 | Bulur et al. | |

\* cited by examiner

FIG.3B

INTELLIGENT BATTERY SELF REPAIR

BACKGROUND

This application relates to batteries, and more particularly to a battery control circuit that controls whether battery cells are connected to each other.

Electrical batteries can be used to provide electrical power to devices within specific voltage and current ranges. Electrical batteries are composed of cells connected in series and/or in parallel. The individual cells of a battery provide a voltage which primarily depends on the chemicals composition of the cells. The design of a given cell limits the voltage and current that the cell is able to provide. Connecting additional cells in parallel increases the current output of a battery, and connecting additional cells in series increases a voltage output of a battery.

As battery cells become depleted, their output will decay. However, the rate of output decay may not be uniform among the cells. This can cause output from the stronger cells to go into the decayed cells rather than to powering a device, which occurs when cells are not close in voltage. This may result in damage to the decayed cells, reduced output from the battery, and/or early failure of the battery.

SUMMARY

One example embodiment of a battery circuit includes a plurality of battery cells. The plurality of battery cells includes at least one connected battery cell and at least one disconnected battery cell. A first switch is configured to disconnect a particular one of the at least one connected battery cells, and a second switch is configured to connect a particular one of the at least one disconnected battery cells. A controller is configured to control the first and second switches based on a detected condition in the particular connected battery cell.

In another example embodiment of the above described battery circuit, the battery circuit includes a plurality of switches, including the first and second switches, that are each associated with a respective battery cell. The controller is configured to control the plurality of switches to maintain a predefined quantity of the battery cells in connection with each other.

In another example embodiment of any of the above described battery circuits, the detected condition in the particular connected battery cell comprises an output of the particular connected battery cell being below a predefined threshold.

In another example embodiment of any of the above described battery circuits, the at least one connected battery cell and the at least one disconnected battery cell are part of a plurality of battery cells, each of which has an associated switch that controls whether the battery cell is connected in parallel to a load and other ones of the battery cells via a shared input node and a shared output node, or is disconnected from the load and the other battery cells. Each switch is connected in series between its associated battery cell and either the shared input node or the shared output node. The first switch is the associated switch for the particular connected battery cell, and the second switch is the associated switch for the particular disconnected battery cell.

In another example embodiment of any of the above described battery circuits, if the associated switch for a given battery cell is between the battery cell and the shared output node, no switch is included between the shared input node and the input of the given battery cell.

In another example embodiment of any of the above described battery circuits, the at least one connected battery cell and the at least one disconnected battery cell are part of a plurality of battery cells that each have a respective input node and output node, and each have an associated pair of switches that are configured to implement either a first configuration in which the input and output nodes connect the battery cell in series with other ones of the battery cells, or a second configuration in which the input and output nodes are connected via a respective bypass line and the battery cell is disconnected from the other ones of the battery cells. The controller is configured to control the pairs of switches to selectively reconfigure the particular connected battery cell to the second configuration and reconfigure the particular disconnected battery cell to the first configuration in response to the detected condition. The pair of switches for the particular connected battery cell includes the first switch, and the pair of switches for the particular disconnected battery cell includes the second switch.

In another example embodiment of any of the above described battery circuits, for each of the plurality of battery cells, a connection switch of the pair is situated between the battery cell and either the input node or the output node of the battery cell, and a bypass switch of the pair is part of the bypass line.

In another example embodiment of any of the above described battery circuits, in the first configuration the connection switch is ON and the bypass switch is OFF, and in the second configuration the connection switch is OFF and the bypass switch is ON.

One example embodiment of a method of controlling battery cells includes detecting a condition in at least one connected battery cell. Based on the detecting, a first switch is controlled to disconnect a particular one of the at least one connected battery cells, and a second switch is controlled to connect a particular one of at least one disconnected battery cell.

In another example embodiment of the above described method, the detecting comprises measuring an output of the particular connected battery cell, and detecting, based on the measuring, that an output of the particular connected battery cell is below a predefined threshold.

In another example embodiment of any of the above described methods, the at least one connected battery cell and the at least one disconnected battery cell are part of a plurality of battery cells, and a predefined quantity of the plurality of battery cells are maintained in connection with each other and a load.

In another example embodiment of any of the above described methods, the at least one connected battery cell and the at least one disconnected battery cell are part of a plurality of battery cells, each of which has an associated switch that controls whether the battery cell is connected in parallel to a load and other ones of the battery cells via a shared input node and a shared output node, or is disconnected from the load and the other battery cells, each switch being connected in series between its associated battery cell and either the shared input node or the shared output node. The first switch is the associated switch for the particular connected battery cell, and the second switch is the associated switch for the particular disconnected battery cell.

In another example embodiment of any of the above described methods, the at least one connected battery cell and the at least one disconnected battery cell are part of a plurality of battery cells, each of which has a respective input node and output node, and each of which has an associated pair of switches that are configured to implement either a first configuration in which the input and output nodes connect the battery cell in series with other ones of the battery cells, or a second configuration in which the input and output nodes are connected via a respective bypass line and the battery cell is disconnected from the other ones of the battery cells. The pair of switches for the particular connected battery cell includes the first switch, and the pair of switches for the particular disconnected battery cell includes the second switch.

In another example embodiment of any of the above described methods, for each of the plurality of battery cells, a connection switch of the pair is situated between the battery cell and either the input node or the output node of the battery cell, and a bypass switch of the pair is part of the bypass line.

In another example embodiment of any of the above described methods, in the first configuration the connection switch is ON and the bypass switch is OFF, and in the second configuration the connection switch is OFF and the bypass switch is ON.

One example embodiment of a space suit includes a battery configured to power a load, the battery comprising a plurality of battery cells, at least one of which is connected and at least one of which is disconnected. A first switch is configured to disconnect a particular one of the at least one connected battery cells, and a second switch is configured to connect a particular one of the at least one disconnected battery cells. A controller is configured to control the first and second switches based on a detected condition in the particular connected battery cell.

In another example embodiment of the above described space suit, the at least one connected battery cell and at least one disconnected battery cell are part of a plurality of battery cells, each of which has an associated switch that controls whether the battery cell is connected in parallel to the load and other ones of the battery cells via a shared input node and a shared output node, or is disconnected from the load and the other battery cells. Each switch is connected in series between its associated battery cell and either the shared input node or the shared output node. The first switch is the associated switch for the particular connected battery cell, and the second switch is the associated switch for the particular disconnected battery cell.

In another example embodiment of any of the above described space suits, if the associated switch for a given battery cell is between the battery cell and the shared output node, no switch is included between the shared input node and the input of the given battery cell.

In another example embodiment of any of the above described space suits, the at least one connected battery cell and at least one disconnected battery cell are part of a plurality of battery cells that each have a respective input node and output node, and each have an associated pair of switches that are configured to implement either a first configuration in which the input and output nodes connect the battery cell in series with other ones of the battery cells, or a second configuration in which the input and output nodes are connected via a respective bypass line and the battery cell is disconnected from the other ones of the battery cells. The controller is configured to control the pairs of switches to selectively reconfigure the particular connected battery cell to the second configuration and reconfigure the particular disconnected battery cell to the first configuration in response to the detected condition. The pair of switches for the particular connected battery cell includes the first switch, and the pair of switches for the particular disconnected battery cell includes the second switch.

In another example embodiment of any of the above described space suits, for each of the plurality of battery cells, a connection switch of the pair is situated between the battery cell and either the input node or the output node of the battery cell, and a bypass switch of the pair is part of the bypass line. In the first configuration the connection switch is ON and the bypass switch is OFF, and in the second configuration the connection switch is OFF and the bypass switch is ON.

These and other features may be best understood from the following drawings and specification.

The embodiments described herein may be taken independently or in any combination. Features described in connection with one embodiment are applicable to all embodiments, unless such features are incompatible.

DETAILED DESCRIPTION

Figure 1:
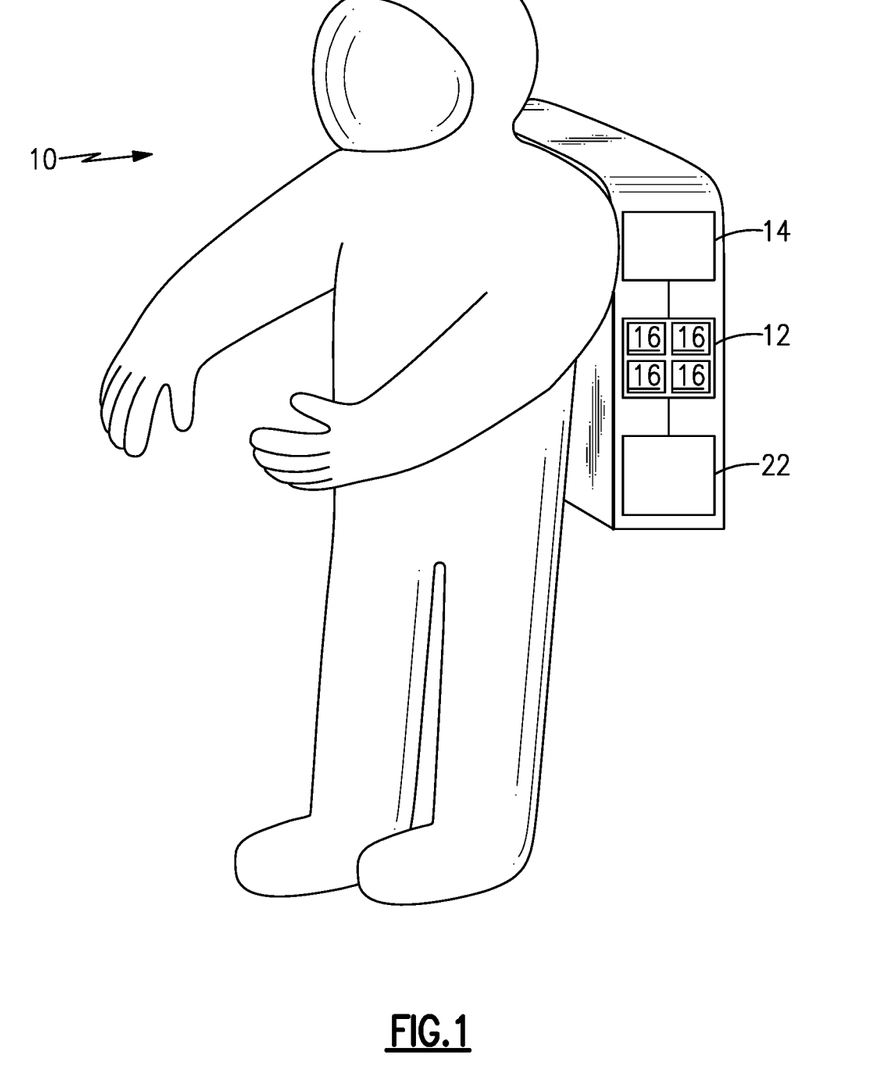
FIG. 1 schematically illustrates a space suit that includes a battery having a plurality of cells.

FIG. 1 schematically illustrates a space suit 10 that includes a battery 12 that powers a load 14. The battery comprises a plurality of cells 16 that can be selectively connected in series or in parallel to power the load 14. The load 14 may include components such as a motor for cooling and/or distributing air within the space suit 10, for example. The space suit 10 also includes a controller 22 that is configured to measure an output of the cells 16 and control which ones of the cells 16 are connected to each other and the load 14. A first subset of the battery cells 16 are primary cells that are initially connected in parallel to each other and to the load 14, and a different, second subset of the battery cells 16 are spare cells that are initially disconnected from each other and the first subset of battery cells. The controller 22 is able to disconnect primary cells, and connect spare cells as needed. This is especially valuable in space suits, as space walks are logistically challenging to plan, and it would be very burdensome for an astronaut to have to travel back to a space craft during a spacewalk because of a battery failure.

Figure 2A:
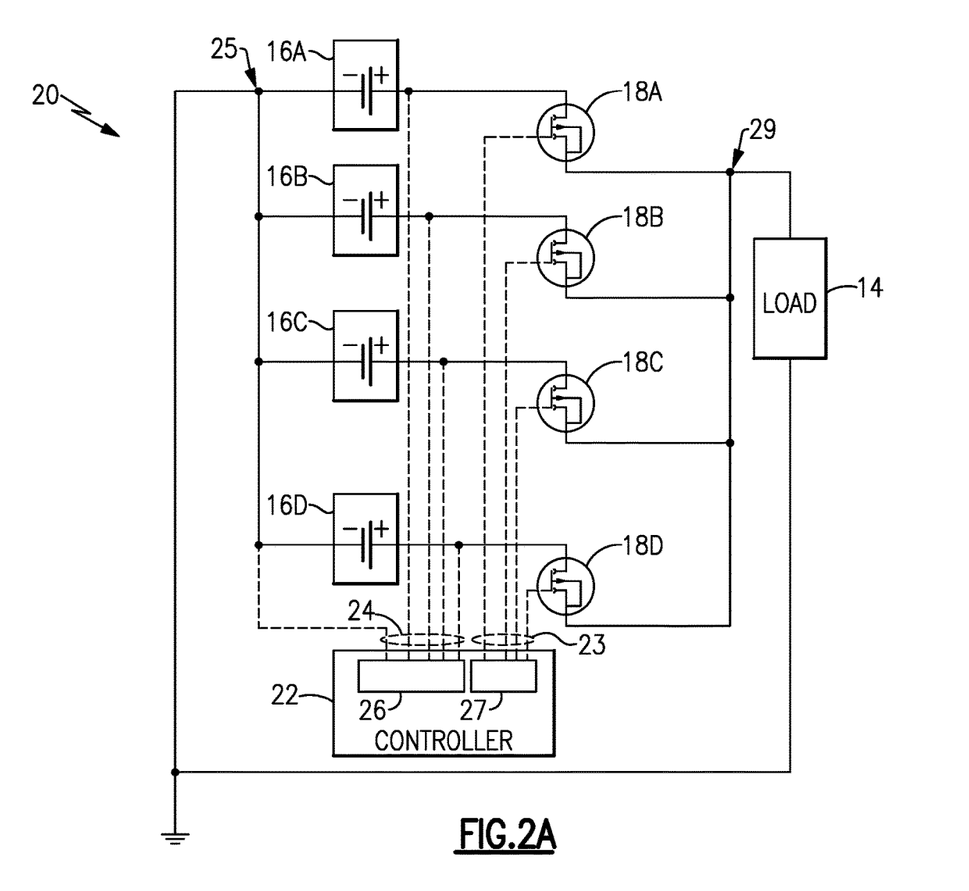
FIG. 2A schematically illustrates an example parallel circuit for controlling which cells are used in a battery.

FIG. 2A schematically illustrates an example circuit 20 for controlling which cells 16 are used in a battery, such as the battery 12. Battery cells 16A-D are included, and are connectable in parallel between a shared input node 25 and a shared output node 29. Each of the cells 16A-D has an associated switch 18 that controls whether its associated battery cell 16 is connected in parallel to other ones of the battery cells 16 (between nodes 25 and 29) and to the load 14, or is disconnected from the load 14 and the other battery cells 16. In the example of FIG. 2A, each switch 18 is connected in series between the output of its battery cell 16 (i.e., its positive terminal) and node 29. However, as discussed below, one or more of the switches 18 could instead be located between the input node 25 and the input of its battery cell 16 (i.e., its negative terminal).

Controller 22 is operative to control the switches 18 via control lines 23 to selectively connect and disconnect the cells 16 from each other and from the load 14. This can be done based on a detected condition in the cells, such as a diminished voltage and/or current of a given cell 16, for example. Such a condition can be detected via measurement lines 24. In one example, the controller 22 monitors the output voltages of the cells 16, and is configured to recognize when a voltage of a given cell falls beneath a predefined voltage threshold (or a current of a given cell falls beneath a predefined current threshold).

For the discussion below, assume that cells 16A-C are primary cells that are initially connected (i.e., switches 18A-C are ON), and that cell 16D is a spare cell that is initially disconnected (i.e., switch 18D is OFF). Say the controller 22 detects that an output voltage of cell 16C falls beneath a predefined voltage threshold. If no action is taken, the cell 16C may absorb current from the other cells 16-B, heating the cell 16C and further degrading its condition. To avoid this, the controller may turn OFF switch 18C, which disconnects the cell 16C from cells 16A-B and from the load 14, and turn ON switch 18D to connect cell 16D in its place. This enables the battery 12 to maintain a desired output without relying on depleted cells.

In one or more embodiments, the controller 22 is configured to control the switches 18 to maintain a predefined quantity of the battery cells 16 in parallel connection with each other (e.g., three cells in FIG. 2A). Although only four cells have been illustrated and discussed above (e.g., three of which are primary and one of which is a spare), it is understood that any number of cells could be used, and that different quantities of those could be configured as primary cells and spare cells.

In the example of FIG. 2A, no switches 18 are included between the input node 25 the inputs of the cells (i.e., their negative terminals). In this regard, a single switch for each cell is operative to control whether its associated cell 16 is connected.

Figure 2B:
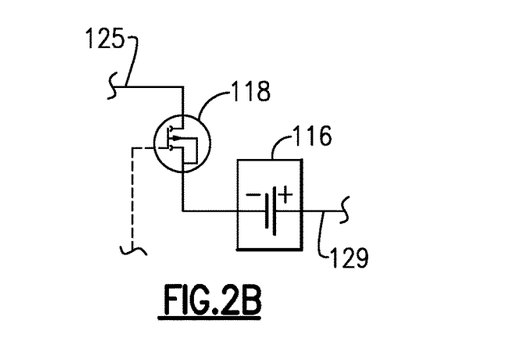
FIG. 2B shows an alternative circuit with control at the negative side of a cell.

In an alternative configuration, shown in FIG. 2B, the switches 118 could be relocated to be connected in series between the input node 125 and the inputs of the cells 116. There is no switch between the cell 116 and output node 129. Such a configuration may increase an ON resistance of the switch 118 as compared to the configuration depicted in FIG. 2A for switch 18.

The controller 22 includes a measurement circuit 26 that is connected to the input (negative) and output (positive) terminals of each of the cells 16 via measurement lines 24. In one example, the measurement circuit 26 utilizes a multiplexor to alternate for which of the cells 16 it is performing measurements. The measurements may be voltage and/or current measurements, for example. The measurement circuit 26 may include an analog-to-digital converter to provide digital voltage and/or current values for comparison to a predefined threshold. The controller 22 may include a microprocessor and associated memory (not shown) to perform such comparisons.

The controller 22 also includes a switching control circuit 27 that controls the state of each switch 18 via the control lines 23, which are connected to the gate of each switch 18A-D to control whether the individual switches 18A-D are ON or OFF.

Figures 3A, 3B:
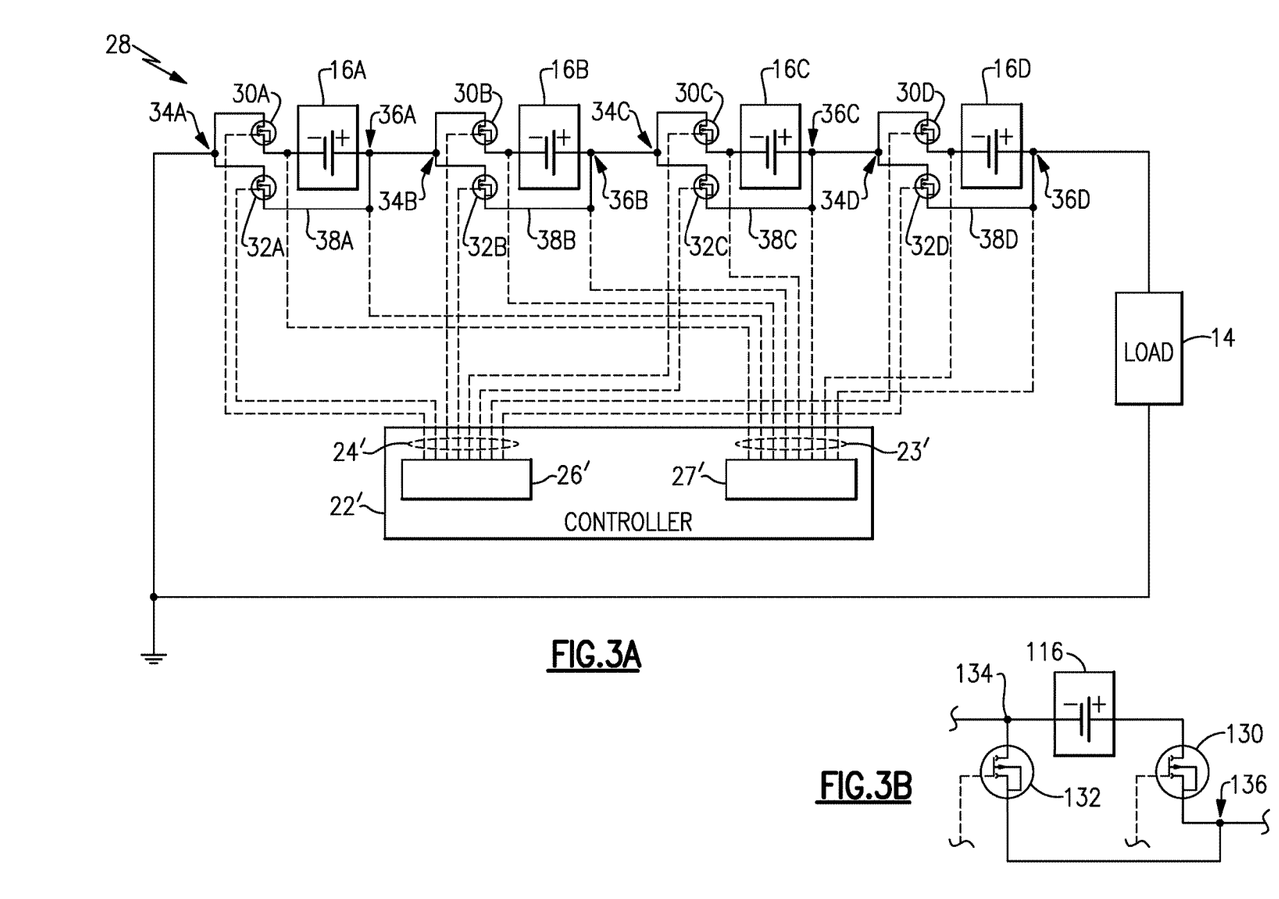
FIG. 3A schematically illustrates another example circuit for controlling which cells in series are used in a battery.
FIG. 3B shows an alternative circuit with control at both sides of the cell.

FIG. 3A schematically illustrates another example circuit 28 for controlling which cells 16 are used in a battery 12. In FIG. 3A, battery cells 16A-D are included, and each of the cells 16A-D has a respective input node 34 and output node 36. Each battery cell 16A-D also has an associated pair of switches 30, 32 that are configured to implement either a first configuration in which the input and output nodes 34, 36 connect the battery cell 16 in series with other ones of the battery cells 16, or a second configuration in which the input and output nodes 34, 36 are connected via a respective bypass line 38 and the battery cell 16 is disconnected from the other battery cells.

For each of the battery cells 16 in FIG. 3A, a first, connection switch 30 of its pair of switches is situated between its input node 34 and an input terminal of the given battery cell (i.e., its negative terminal), and a second, bypass switch 32 of its pair of switches is part of the bypass line 38. For a given cell 16 to be in the first configuration, its associated switch 30 is ON and its associated switch 32 is OFF. For that cell 16 to be in the second configuration, its switch 30 is turned OFF and its switch 32 is turned ON.

In an alternative configuration, shown in FIG. 3B, the first switch 130 is instead situated between an output terminal of the battery cell (i.e., its positive terminal) and its output node 136, and there is no switch between the cell 116 and its input node 134.

Controller 22' is configured to control the switches 30, 32 such that a first subset of the battery cells 16 are primary cells that are initially connected in series to each other, and a different, second subset of the battery cells 16 are spare cells that are initially disconnected from each other and the first subset of battery cells. For the discussion below, assume that cells 16A-C are primary cells that are initially connected (i.e., switches 30A-C are ON, and switches 32A-C are turned OFF), and that cell 16D is a spare cell that is initially disconnected (i.e., switch 30D is OFF, and switch 32D is ON).

Assume also that the controller 22' detects that the output voltage of cell 16C falls beneath a predefined voltage threshold. Based on this detection, the controller 22' turns switch 30C OFF, and turns switch 32C ON, which connects nodes 34C, 36C via bypass line 38 and disconnects cell 16C from the other cells 16A-B and from the load 14. The controller 22' also connects cell 16D to the other cells 16A-B by turning switch 30D ON and turning switch 32D OFF. This enables the battery 12 to maintain a desired output without relying on depleted cells 16.

Here too, although only four cells have been illustrated and discussed above (e.g., three of which are primary and one of which is a spare), it is understood that any number of cells could be used, and that different quantities of those could be configured as primary cells and spare cells.

Controller 22' includes a switching control circuit 27' that is configured to control the switches 18 via control lines 23' to selectively connect and disconnect the cells 16 from each other and from the load. The controller 22' also includes a measurement circuit 26' that is configured to measure an output of each of the cells 16 via measurement lines 24' (e.g., voltage and/or current measurements). As in the previous example, and analog-to-digital converter, microprocessor, and memory may be included in the measurement circuit 26'.

Figure 4:
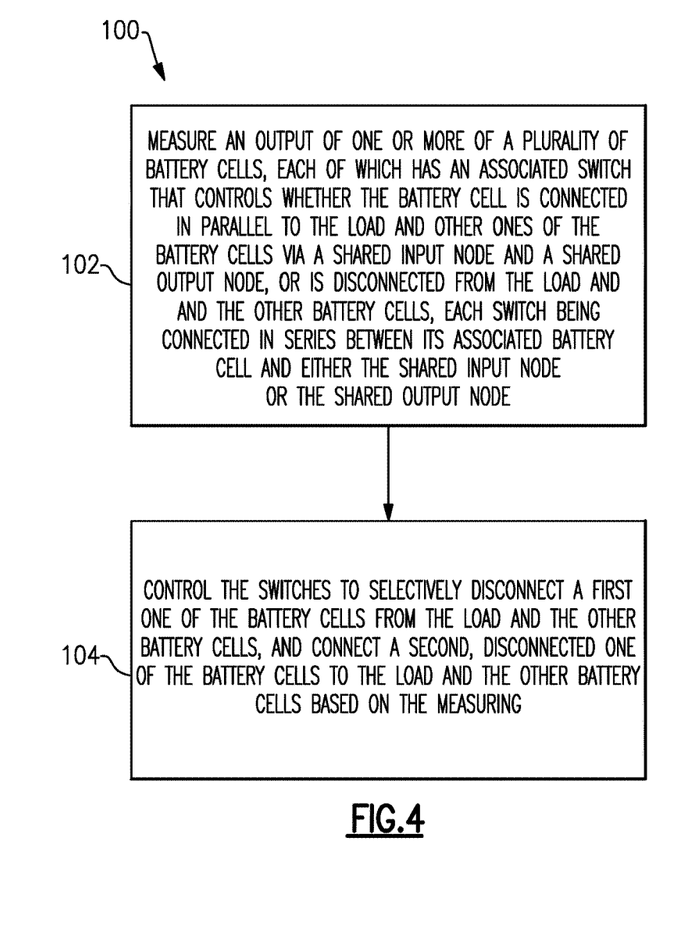
FIG. 4 is a flowchart of a method that may be used in conjunction with the circuit of FIG. 2A or 2B.

FIG. 4 is a flowchart of a method 100 for controlling a plurality of battery cells 16 connected in parallel that may be used in conjunction with the circuit of FIG. 2A or 2B. An output of one or more of a plurality of battery cells 16 is measured (e.g., an output voltage or current) (block 102). Each of the cells 16 are connectable in parallel between an input node 25 and an output node 29. Each battery cell has an associated switch 18 that controls whether the battery cell 16 is connected in parallel to the load 14 and with other ones of the battery cells 16 via a shared input node 25 and a shared output node 29, or is disconnected from the load 14 and the other battery cells 16. Each switch 18 is connected in series either between the input node 25 and an input of its associated battery cell 16 (i.e., its negative terminal) or between the output node 29 and an output of its associated battery cell 16 (i.e., its positive terminal). The switches are controlled (block 104) to selectively disconnect a first one of the battery cells 16 from the load 14 and the other battery cells 16, and connect a second, disconnected one of the battery cells 16 to the load 14 and the other battery cells 16 based on the measuring of block 102.

Figure 5:
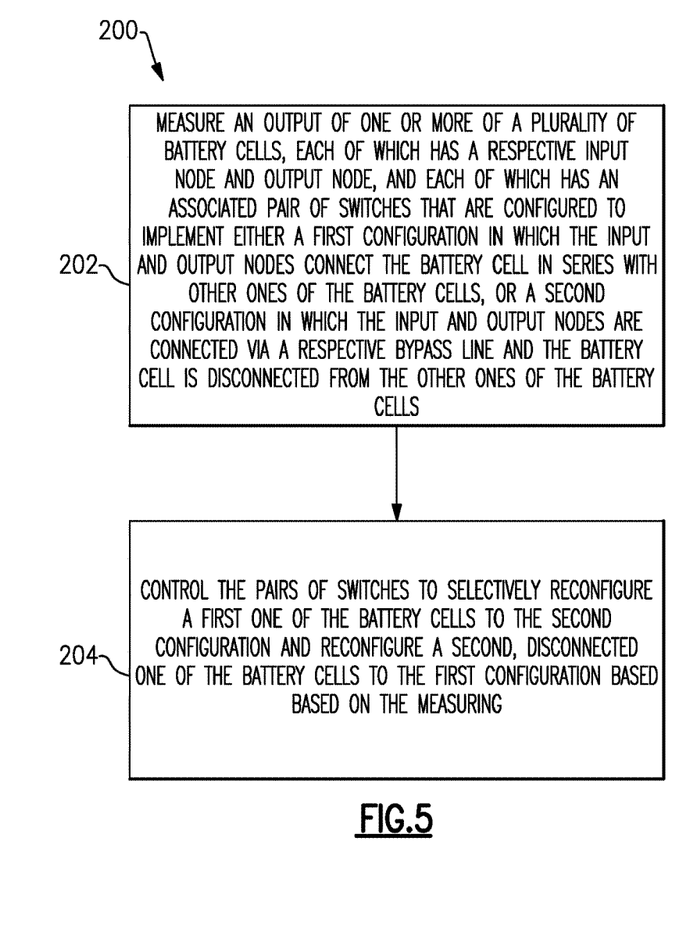
FIG. 5 is a flowchart of a method that may be used in conjunction with the circuit of FIG. 3A or 3B.

FIG. 5 is a flowchart of a method 200 for controlling a plurality of battery cells 16 connected in series that may be used in conjunction with the circuit of FIG. 3A or 3B. An output of one or more of a plurality of battery cells 16 is measured (e.g., an output voltage or current) (block 202). Each of the battery cells 16 has a respective input node 34 and output node 36, and each of the battery cells 16 also has an associated pair of switches 30, 32 that are configured to implement either a first configuration in which the input and output nodes 34, 36 connect the battery cell 16 in series with other ones of the battery cells 16, or a second configuration in which the input and output nodes 34, 36 are connected via a respective bypass line 38 and the battery cell 16 is disconnected from the other ones of the battery cells 16. The pairs of switches 30, 32 are controlled (block 204) to selectively reconfigure a first one of the battery cells to the second configuration and reconfigure a second, disconnected one of the battery cells to the first configuration based on the measuring.

The various embodiments discussed above facilitate disconnection of a depleted battery cell, which can preserve the power in the rest of the cells of a battery 12, and also facilitate connection of a spare battery cell to maintain a desired battery output. This can be particularly useful for space suits where consistent and reliable power is needed.

The embodiments discussed above also enable use of a small number of switches to implement the disclosed functionality, which enables complexity reduction in circuit design and an increase in reliability.

Of course, although the circuits 20, 28 have been discussed in connection with powering a space suit 10, it is understood that other non-space suit applications would be possible as well where multiple battery cells are utilized. Also, although the switches 18, 30, and 32 have been depicted as P-type MOSFETs, it is understood that different types of switches could be used.

Although example embodiments have been disclosed, a worker of ordinary skill in this art would recognize that certain modifications would come within the scope of this disclosure. For that reason, the following claims should be studied to determine the true scope and content of this disclosure.

What is claimed is:

1. A battery circuit comprising:
a plurality of battery cells, including at least one connected battery cell and at least one disconnected battery cell;
a plurality of switches, each associated with a respective one of the battery cells, including a first switch configured to disconnect a particular one of the at least one connected battery cells, and second switch configured to connect a particular one of the at least one disconnected battery cells; and
a controller that is configured to:
control the first and second switches based on a detected condition in the particular connected battery cell; and
control the plurality of switches to maintain a predefined quantity of the battery cells in connection with each other, maintain remaining ones of the plurality of battery cells disconnected beyond the predefined quantity.

2. The battery circuit of claim 1, wherein the detected condition in the particular connected battery cell comprises an output of the particular connected battery cell being below a predefined threshold.

3. The battery circuit of claim 1:
wherein the associated switch of each battery cell controls whether the battery cell is connected in parallel to a load and other ones of the battery cells via a shared input node and a shared output node, or is disconnected from the load and the other battery cells, each associated switch being connected in series between its associated battery cell and either the shared input node or the shared output node; and
wherein the first switch is the associated switch for the particular connected battery cell, and the second switch is the associated switch for the particular disconnected battery cell.

4. The battery circuit of claim 3, wherein the associated switch for a given battery cell is between the battery cell and the shared output node, and no switch is included between the shared input node and the input of the given battery cell.

5. The battery circuit of claim 1:
wherein said associated switches are connection switches;
wherein the plurality of battery cells each have a respective input node and output node, and each have an associated pair of switches including the associated connection switch and a bypass switch, the pair of switches configured to implement either a first configuration in which the input and output nodes connect the battery cell in series with other ones of the battery cells, or a second configuration in which the input and output nodes are connected via a respective bypass line and the battery cell is disconnected from the other ones of the battery cells;
wherein the controller is configured to control the pairs of switches to selectively reconfigure the particular connected battery cell to the second configuration and reconfigure the particular disconnected battery cell to the first configuration in response to the detected condition; and
wherein the pair of switches for the particular connected battery cell includes the first switch, and the pair of switches for the particular disconnected battery cell includes the second switch.

6. The battery circuit of claim 5, wherein for each of the plurality of battery cells, the connection switch of the pair is situated between the battery cell and either the input node or the output node of the battery cell, and the bypass switch of the pair is part of the bypass line.

7. The battery circuit of claim 6, wherein in the first configuration the connection switch is ON and the bypass switch is OFF, and in the second configuration the connection switch is OFF and the bypass switch is ON.

8. A method of controlling battery cells comprising:
detecting a condition in at least one connected battery cell, the at least one connected battery cell part of a plurality of battery cells that includes at least one disconnected battery cell, each battery cell associated with a respective one of a plurality of switches;

based on the detecting:
controlling a first switch to disconnect a particular one of the at least one connected battery cells; and
controlling a second switch to connect a particular one of the at least one disconnected battery cells; and
controlling the plurality of switches to maintain a predefined quantity of the battery cells in connection with each other, and maintain remaining ones of the plurality of battery cells disconnected beyond the predefined quantity.

9. The method of claim 8, wherein the detecting comprises:
measuring an output of the particular connected battery cell; and
detecting, based on the measuring, that an output of the particular connected battery cell is below a predefined threshold.

10. The method of claim 8:
wherein the associated switch of each battery cell controls whether the battery cell is connected in parallel to a load and other ones of the battery cells via a shared input node and a shared output node, or is disconnected from the load and the other battery cells, each associated switch being connected in series between its associated battery cell and either the shared input node or the shared output node; and
wherein the first switch is the associated switch for the particular connected battery cell, and the second switch is the associated switch for the particular disconnected battery cell.

11. The method of claim 8:
wherein said associated switches are connection switches;
wherein the plurality of battery cells each have a respective input node and output node, and has an associated pair of switches including the associated connection switch and a bypass switch, the pair of switches configured to implement either a first configuration in which the input and output nodes connect the battery cell in series with other ones of the battery cells, or a second configuration in which the input and output nodes are connected via a respective bypass line and the battery cell is disconnected from the other ones of the battery cells; and
wherein the pair of switches for the particular connected battery cell includes the first switch, and the pair of switches for the particular disconnected battery cell includes the second switch.

12. The method of claim 11, wherein for each of the plurality of battery cells, the connection switch of the pair is situated between the battery cell and either the input node or the output node of the battery cell, and the bypass switch of the pair is part of the bypass line.

13. The method of claim 12, wherein in the first configuration the connection switch is ON and the bypass switch is OFF, and in the second configuration the connection switch is OFF and the bypass switch is ON.

14. A space suit comprising:
a battery configured to power a load of the space suit, the battery comprising a plurality of battery cells, at least one of which is connected and at least one of which is disconnected;
a plurality of switches, each associated with a respective one of the battery cells, including a first switch configured to disconnect a particular one of the at least one connected battery cells and second switch configured to connect a particular one of the at least one disconnected battery cells; and
a controller that is configured to:
control the first and second switches based on a detected condition in the particular connected battery cell; and
control the plurality of switches to maintain a predefined quantity of the battery cells in connection with each other, and maintain remaining ones of the plurality of battery cells disconnected beyond the predefined quantity.

15. The space suit of claim 14:
wherein the associated switch of each battery cell controls whether the battery cell is connected in parallel to the load and other ones of the battery cells via a shared input node and a shared output node, or is disconnected from the load and the other battery cells, each associated switch being connected in series between its associated battery cell and either the shared input node or the shared output node
wherein the first switch is the associated switch for the particular connected battery cell, and the second switch is the associated switch for the particular disconnected battery cell.

16. The space suit of claim 15, wherein the associated switch for a given battery cell is between the battery cell and the shared output node, and no switch is included between the shared input node and the input of the given battery cell.

17. The space suit of claim 14:
wherein said associated switches are connection switches;
wherein the plurality of battery cells each have a respective input node and output node, and each have an associated pair of switches including the associated connection switch and a bypass switch, the pair of switches configured to implement either a first configuration in which the input and output nodes connect the battery cell in series with other ones of the battery cells, or a second configuration in which the input and output nodes are connected via a respective bypass line and the battery cell is disconnected from the other ones of the battery cells; and
wherein the controller is configured to control the pairs of switches to selectively reconfigure the particular connected battery cell to the second configuration and reconfigure the particular disconnected battery cell to the first configuration in response to the detected condition; and
wherein the pair of switches for the particular connected battery cell includes the first switch, and the pair of switches for the particular disconnected battery cell includes the second switch.

18. The space suit of claim 17:
wherein for each of the plurality of battery cells, the connection switch of the pair is situated between the battery cell and either the input node or the output node of the battery cell, and the bypass switch of the pair is part of the bypass line; and
wherein in the first configuration the connection switch is ON and the bypass switch is OFF, and in the second configuration the connection switch is OFF and the bypass switch is ON.

* * * * *